United States Patent
Wong

(10) Patent No.: US 10,762,525 B2
(45) Date of Patent: Sep. 1, 2020

(54) METHOD AND SYSTEM FOR PRESENTING A PROMOTIONAL OFFER BASED ON DETECTED DATA

(71) Applicant: Oracle International Corporation, Redwood Shores, CA (US)

(72) Inventor: Hinkmond Wong, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 425 days.

(21) Appl. No.: 14/870,450

(22) Filed: Sep. 30, 2015

(65) Prior Publication Data
US 2017/0091812 A1    Mar. 30, 2017

(51) Int. Cl.
*G06Q 30/02* (2012.01)

(52) U.S. Cl.
CPC ............... *G06Q 30/0253* (2013.01)

(58) Field of Classification Search
CPC .................................................. G06Q 30/0253
USPC ............................................. 705/14.58, 26.1
See application file for complete search history.

(56) References Cited

U.S. PATENT DOCUMENTS

| | | | |
|---|---|---|---|
| 7,934,639 B1 | 5/2011 | Chen et al. | |
| 2002/0087384 A1* | 7/2002 | Neifeld | G06Q 30/02 705/26.1 |
| 2008/0133339 A1 | 6/2008 | Drakoulis et al. | |
| 2010/0082420 A1 | 4/2010 | Trifiletti et al. | |
| 2010/0114688 A1 | 5/2010 | Song et al. | |
| 2012/0047011 A1 | 2/2012 | Rippetoe et al. | |
| 2014/0207499 A1 | 7/2014 | Fliess et al. | |
| 2014/0279014 A1* | 9/2014 | Roka | G06Q 30/0261 705/14.58 |

FOREIGN PATENT DOCUMENTS

WO    WO-2010141656 A1 * 12/2010 ............. G06Q 30/06

OTHER PUBLICATIONS

Sara Vicioso, Programmatic Advertising 101: How It Works, 2015 (Year: 2015).*
Malik, Neha, "How Hotels Can Use Beacons to Enhance Guest Experiences", Hotel, iBeacon, Shared on Tumblr, Jul. 8, 2014, 7 pages.
Anthony, Sebastian, "You Can Now Open Hotel Rooms with Just Smartphone—and Bypass Check-in, too", Nov. 3, 2014, Online Available at <http://www.extremetech.com/extreme/193450-you-can-now-open-hotel-rooms-with-just-your-smartphone-and-bypass-check-in-too>, 5 pages.

(Continued)

*Primary Examiner* — Tarek Elchanti
(74) *Attorney, Agent, or Firm* — Invoke

(57) ABSTRACT

A method and system for presenting a promotional offer based on detected data. Data that is generated by at least one device detecting one or more physical actions performed by a person is obtained. The device is located in a same physical environment as the person. The data is analyzed to determine that a probability of an undesired action, by the person, is above a threshold value. Responsive to determining that the probability of the undesired action is above the threshold value, a promotional offer is presented to the person. The promotional offer lowers the probability of the undesired action by the person.

23 Claims, 5 Drawing Sheets

(56) References Cited

OTHER PUBLICATIONS

Boden, Rian, "Starwood Hotels Picks Bluetooth for Mobile Room Keys that Work on Smartphones and Apple Watch", NFOWorld+, Nov. 3, 2014, online available at <http://www.nfcworld.com/2014/11/03/332389/starwood-hotels-picks-bluetooth-mobile-room-keys-work-smartphones-apple-watch-devices/>, 4 pages.

Estimote, "What are Estimote Beacons?", Online Available at <http://estimote.com/>, retrieved Oct. 20, 2015, 18 pages.

Estimote Inc., "GuestDriven Creates Personalized Hotel Experience with Beacons", Get Inspired, Online Available at <https://community.estimote.com/hc/en-us/articles/204446973-GuestDriven-creates-personalized-hotel-experience-with-beacons>, retrieved on May 8, 2015, 2 pages.

Gottipati, Hari, "With iBeacon, Apple is Going to Dump on NFC and Embrace the Internet of Things", Sep. 10, 2013, Online Available at <https://gigaom.com/2013/09/10/with-ibeacon-apple-is-going-to-dump-on-nfc-and-embrace-the-internet-of-things/>, 16 pages.

Health Tech Insider, "Home Health Hubs to Grow Rapidly", May 1, 2015, Online Available at <http://healthtechinsider.com/tag/big-data/>, 19 pages.

Iconeme, "The Shop Window Becomes a Portal for Interactive Selling", Online Available at <http://www.iconeme.com/how-it-works.html>, retrieved on May 6, 2015, 1 page.

Apple Inc., "Creating Action Sets and Triggers", Online Available at <https://developer.apple.com/library/ios/documentation/NetworkingInternet/Conceptual/HomeKitDeveloperGuide/CreatingActionSetsandScenes/CreatingActionSetsandScenes.html#//apple_ref/doc/uid/TP40015050-CH8-SW1>, retrieved on May 6, 2015, 3 pages.

Apple Inc., "Introduction to HomeKit", Online Available at <https://developer.apple.com/library/ios/documentation/NetworkingInternet/Conceptual/HomeKitDeveloperGuide/Introduction/Introduction.html>, retrieved on May 6, 2015, 2 pages.

Laird, Scott, "Starwood, Hilton Hotels Replace Key Cards with Bluetooth", Online Available at <http://www.examiner.com/article/starwood-hilton-hotels-replace-key-cards-with-bluetooth>, Nov. 3, 2014, 3 pages.

Nest Thermostat, "Inside & out Nest", Online Available at <https://nest.com/thermostat/inside-and-out/#explore-your-nest>, Retrieved on May 6, 2015, 8 pages.

PWC, "The Wearable Future", Consumer Intelligence Series, Online Available at <http://www.slideshare.net/PWC/the-wearable-future?from_action=save&from=fblanding>, Nov. 5, 2014, 50 pages.

Qburst, "Comprehensive Hotel Management Platform", Hotel Management System Integrated with Mobile Application, Online Available at <http://www.qburst.com/resources/case-studies/hotel-software>, Retrieved on Mar. 13, 2015, 5 pages.

Ranger, Steve, "What is Apple iBeacon? Here's What You Need to Know", The Bluetooth-powered location system that could shake up shopping (and more) forever, Online available at <http://www.zdnet.com/article/what-is-apple-ibeacon-heres-what-you-need-to-know/>, Jun. 10, 2014, 10 pages.

RFID News Roundup, "Guestdriven, Estimote Deliver Beacon Solution to Hotel Industry", RFID Journal, Online Available at <http://www.rfidjournal.com/articles/view?12509/7>, Retrieved on Mar. 12, 2015, 1 page.

Iconeme, "How Does the VMBeacon work?", Online available at <http://www.iconeme.com/how-it-works.html>. Retrived on Nov. 9, 2015, 34 pages.

Universal Display & Design Inc., "The Future of Retail", UDQ Technology Launch, 2014, 13 pages.

Fitbit Inc., "Fitbit Premium is Your 24/7 Digital:", Online available at <https://www.fitbit.com/premium/about >, Retrieved on Nov. 13, 2015, 2 pages.

Dubois, Lou, "How to Combine Foursquare and Your Loyalty Program", Published on Jul. 21, 2011, Online available at <http://www.inc.com/guides/201107/how-to-combine-foursquare-and-your-loyalty-program.html>, Retrieved on Nov. 13, 2015, 5 pages.

Fletcher, Dan, "Foursquare's Twist on Facebook: A Reward for Checking In", Foursquare Rewards Social Networks for Location Info—TIME, Jan. 15, 2010, Online Available at <http://content.time.com/time/business/article/0,8599,1952980,00.html>, Retrieved on Nov. 13, 2015, 2 pages.

NEC, "NeoFace Watch", Face Recognition, Public Safety Case Studies, Online available at <http://www.nec.com/en/global/solutions/safety/face_recognition/NeoFaceWatch.html>, Retrieved on Nov. 13, 2015, 3 pages.

Phase IV Engineering Inc., "About Ultra Long-Range UHF RFID Sensors", Copyright 2014-2015, Online Available at <http://www.phaseivengr.com/wireless-technologies/wireless-technologies-overview/about-wireless-rfid-sensors/about-ultra-long-range-uhf-rfid-sensors/>, Retrieved on Nov. 13, 2015, 3 pages.

Stardot Technologies, "License Plate Capture", Online Available at <http://www.stardot.com/solution/license-plate-capture>, Retrieved on Nov. 13, 2015, 2 pages.

* cited by examiner

METHOD AND SYSTEM FOR PRESENTING A PROMOTIONAL OFFER BASED ON DETECTED DATA

TECHNICAL FIELD

The present disclosure relates to presenting a promotional offer. In particular, the present disclosure relates to presenting a promotional offer based on detected data.

BACKGROUND

Data is being detected by an increasing number and variety of devices and sensors. For example, motion data is detected by an accelerometer, temperature data is detected by a thermometer, and payment data is detected by a smartphone through which a user makes a purchase. Analysis on the data can generate a variety of insights, which can be used to improve quality of life. However, the value of various types of data, and the value of the aggregation of the data, is not being fully captured.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. PRESENTING A PROMOTIONAL OFFER TO LOWER A PROBABILITY OF AN UNDESIRED ACTION BY A PERSON USING DETECTED DATA
4. PRESENTING A PROMOTIONAL OFFER USING DETECTED DATA FROM MULTIPLE BUSINESS ENTITIES
5. EXAMPLE EMBODIMENTS
6. MISCELLANEOUS; EXTENSIONS
7. HARDWARE OVERVIEW

1. GENERAL OVERVIEW

In one or more embodiments, a promotional offer for a person is provided based on detected data. In an embodiment, a promotional offer includes free and/or discounted goods and/or services.

In one or more embodiments, a probability of an undesired action, by the person, is determined based on data that is generated by at least one device detecting one or more physical actions performed by the person. If the probability of the undesired action is above a threshold, then a promotional offer that lowers the probability of the undesired action by the person is presented to the person.

In one or more embodiments, detected data from devices managed by multiple business entities are obtained and aggregated. The detected data is associated with different data types, such as motion data, heart rate data, environmental data, user input data, and user profile data. The detected data is associated with a particular person. If the detected data satisfies one or more criteria, then a promotional offer is presented to the particular person. In an embodiment, the promotional offer is provided as a reward to the particular person.

2. ARCHITECTURAL OVERVIEW

Figure 1:
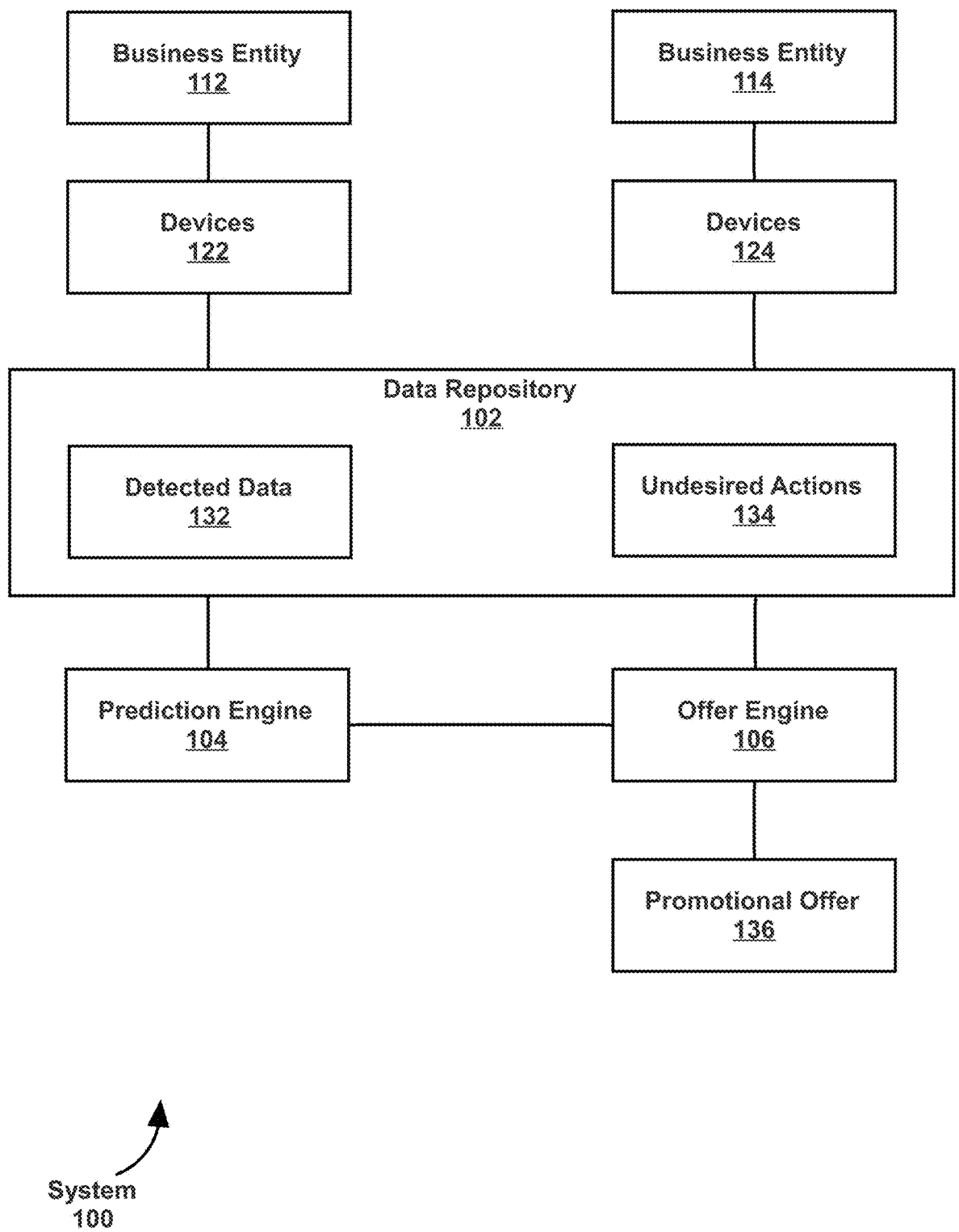
FIG. 1 illustrates a system in accordance with one or more embodiments.

FIG. 1 illustrates a system 100 in accordance with one or more embodiments. As illustrated in FIG. 1, system 100 includes business entities 112-114, devices 122-124, data repository 102, prediction engine 104, offer engine 106, and promotional offer 136. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, devices 122-124 include any device that is capable of detecting data. In an embodiment, devices 122-124 include a sensor. A sensor is a transducer that is configured to sense or detect one or more characteristics of the sensor's environment. Based on the characteristic detected, the sensor provides a corresponding output, such as an electrical or optical signal. Types of sensors include but are not limited to a temperature sensor, a pressure sensor, an ultrasonic sensor, a humidity sensor, a gas sensor, a radio-frequency identification (RFID) sensor, a motion sensor, an acceleration sensor, a displacement sensor, a location sensor, a tactile sensor, a proximity sensor, an audio sensor, a light sensor, a chemical sensor, a physiological sensor, and a bio sensor. Examples of sensors include but are not limited to an accelerometer, a heart rate sensor, a pedometer, a camera, a video camcorder, a microphone, a hygrometer, a thermometer, and a Global Positioning System (GPS) detector.

In an embodiment, devices 122-124 include a digital device. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, a personal digital assistant ("PDA"). In an embodiment, a digital device is configured to accept user input through a user interface. User input is accepted from an input/output devices, such as a keyboard, a touchscreen, a microphone, or a button. In an embodiment, a digital device is configured to accept user input based on proximity. For example, a car door is unlocked when a car key is detected within a certain proximity to the car, using keyless entry technology. In an embodiment, a digital device is configured to accept data through an application programming interface (API). In an embodiment, a digital device is configured to accept data from another digital device through a network interface or other communications interface.

In one or more embodiments, business entities 112-124 include a corporation, organization, enterprise or other entity that manages devices 122-124. Business entity 112 manages one or more devices 122. Business entity 114 manages one or more devices 124. In an embodiment, devices 122, managed by business entity 112, do not overlap with devices 124, managed by business entity 114.

In an embodiment, business entity 112 and business entity 114 are independent from each other. A business or operation of business entity 112 is separate from a business or operation of business entity 114. For example, business entity 112 is an airline company and business entity 114 is a car rental company. As another example, business entity 112 is an airline company and business entity 114 is a law firm.

In an embodiment, business entities 112-114 manage software implemented on devices 122-124. For example, business entities 112-114 install software on devices 122-124, write code or instructions for the software, and/or otherwise control the software of devices 122-124. In an embodiment, business entities 112-114 manage hardware of devices 122-124. For example, business entities 112-114 manufacture a component of devices 122-124, program a processor of devices 122-124, and/or otherwise control the hardware of devices 122-124. In an embodiment, business entities 112-114 manages the data detected by devices 122-124. For example, business entities 112-114 apply privacy and/or security policies on the data detected by devices 122-124, obtain authorization to access the data from users, and/or otherwise control the data detected by devices 122-124.

In one or more embodiments, data repository 102 is any type of storage unit and/or device (e.g., a file system, database, collection of tables, or any other storage mechanism) for storing data. Further, data repository 102 may include multiple different storage units and/or devices. The multiple different storage units and/or devices may or may not be of the same type or located at the same physical site. Further, data repository 102 may be or may execute on the same computing system as prediction engine 104, offer engine 106, and/or devices 122-124. Alternatively or additionally, data repository 102 may be on a separate computing system than prediction engine 104, offer engine 106, and/or devices 122-124. Data repository 102 may be connected to prediction engine 104, offer engine 106, and/or devices 122-124 via a direct connection or via a network.

Data sets describing detected data 132 and undesired actions 134 may be implemented across any of components within system 100. However, these data sets are illustrated within data repository 102 for purposes of clarity and explanation.

In one or more embodiments, detected data 132 includes any data that is detected by devices 122-124. Detected data 132 may be associated with a variety of data types. Different data types are detected by different types of devices. Detected data 132 includes data representing active action by a user, such as user input data, tactile data, and payment data. Detected data 132 includes data representing passive action by a user, such as motion data, facial recognition, location data, physiological data, and bio data. Detected data 132 includes environmental information, such as temperate data, pressure data, ultrasonic data, humidity data, gas data, audio data, light data, and chemical data. Detected data 132 includes machine-generated data.

In an embodiment, detected data 132 represents one or more micro-actions performed by a person. Examples of micro-actions include a physical action detected by an accelerometer, payment detected by an application running on a smartphone, and the unlocking of a door detected by an electronic lock. Detected data 132 representing micro-actions may be processed to obtain additional information. In an example, motion data is processed to determine the number of steps walked by a user. In another example, payment data is processed to determine a total number of transactions performed by a user over a particular time period.

In an embodiment, detected data 132 includes an aggregation of data of multiple data types. In an example, detected data 132 is a user profile. The user profile includes a name and gender of the user, which is based on user input data. The user profile also includes a web surfing history of the user, which is compiled from user input data. The user profile also includes a physical health of the user, which is based on physiological data of the user.

In an embodiment, detected data 132 is stored in a multi-tenant environment. Detected data 132 is also stored in a cloud environment. Detected data 132 is tagged with an identifier of the business entity from which the detected data 132 originated. Detected data 132 of business entity 112 is not shared with business entity 114. Detected data 132 of business entity 114 is not shared with business entity 112. However, analyses on detected data 132 of business entity 112 may be shared with business entity 114. Analyses on detected data 132 of business entity 114 may be shared with business entity 112.

In one or more embodiments, undesired actions 134 include actions, performed by one or more persons, that are not desired by business entities 112-114 and/or other entities (not shown). Examples of undesired actions 134 include but are not limited to a person leaving a store without making a purchase, a person purchasing goods and/or services from a competing business, and a user's surfing away from a website and/or webpage.

In an embodiment, undesired actions 134 are correlated with types of detected data 132. Measures of correlation are found between each undesired action 134 and each data type. A correlation between a particular data type and a first undesired action 134 may be above a threshold, while a correlation between the particular data type and a second undesired action 134 may be below a threshold. If a correlation between a particular data type and a particular undesired action 134 is above a threshold, then a probability that the particular undesired action 134 will occur may be determined using detected data 132 of the particular data type.

In an example, detected data 132 includes (a) a heart rate of a person, and (b) physical motion of the person. An undesired action by the person is the person's departure from a store without making a purchase. A high correlation exists between a person's physical motion and a probability that the person will depart the store without making a purchase. If the person walks through a store at a high speed, then the person will likely depart the store without making a purchase. If the person stands in line for a long period of time, then the person will likely depart the store without making a purchase. On the other hand, a low correlation exists between a person's heart rate and a probability that the person will depart the store without making a purchase. Whether the heart rate is high or low, the heart rate does not have a significant effect on the likelihood that the person will depart the store without making a purchase.

In an embodiment, promotional offer 136 includes but is not limited to free goods and/or services, discounted goods and/or services, a reward, and an object or opportunity of value. Promotional offer 136 is presented to a person in order to lower a probability of an undesired action by the person. Additionally or alternatively, promotional offer 136 is provided for a user based on detected data that is received from multiple business entities 112-114 and/or associated with multiple data types. Promotional offer 136 is presented to a user through a user interface. Promotional offer 136 may be accepted by the user immediately or some later in the future.

In one or more embodiments, prediction engine 104 refers to hardware and/or software configured to perform operations described herein for determining a probability of an undesired action 134 using detected data 132. In an embodiment, prediction engine 104 is implemented on one or more digital devices. Example operations for determining a probability of an undesired action 134 is described below with reference to FIG. 2A.

In one or more embodiments, offer engine 106 refers to hardware and/or software configured to perform operations described herein for providing a promotional offer 136 for a user using detected data 132. In an embodiment, a determination of offer engine 106 depends on a probability of an undesired action determined by prediction engine 104. In an embodiment, a determination of offer engine 106 depends on detected data 132 that is received from multiple business entities 112-114 and/or associated with multiple data types. In an embodiment, offer engine 106 is implemented on one or more digital devices. Operations for providing a promotional offer 136 using detected data 132 is described below with reference to FIGS. 2A-2B.

3. PRESENTING A PROMOTIONAL OFFER TO LOWER A PROBABILITY OF AN UNDESIRED ACTION BY A PERSON USING DETECTED DATA

Figure 2A:
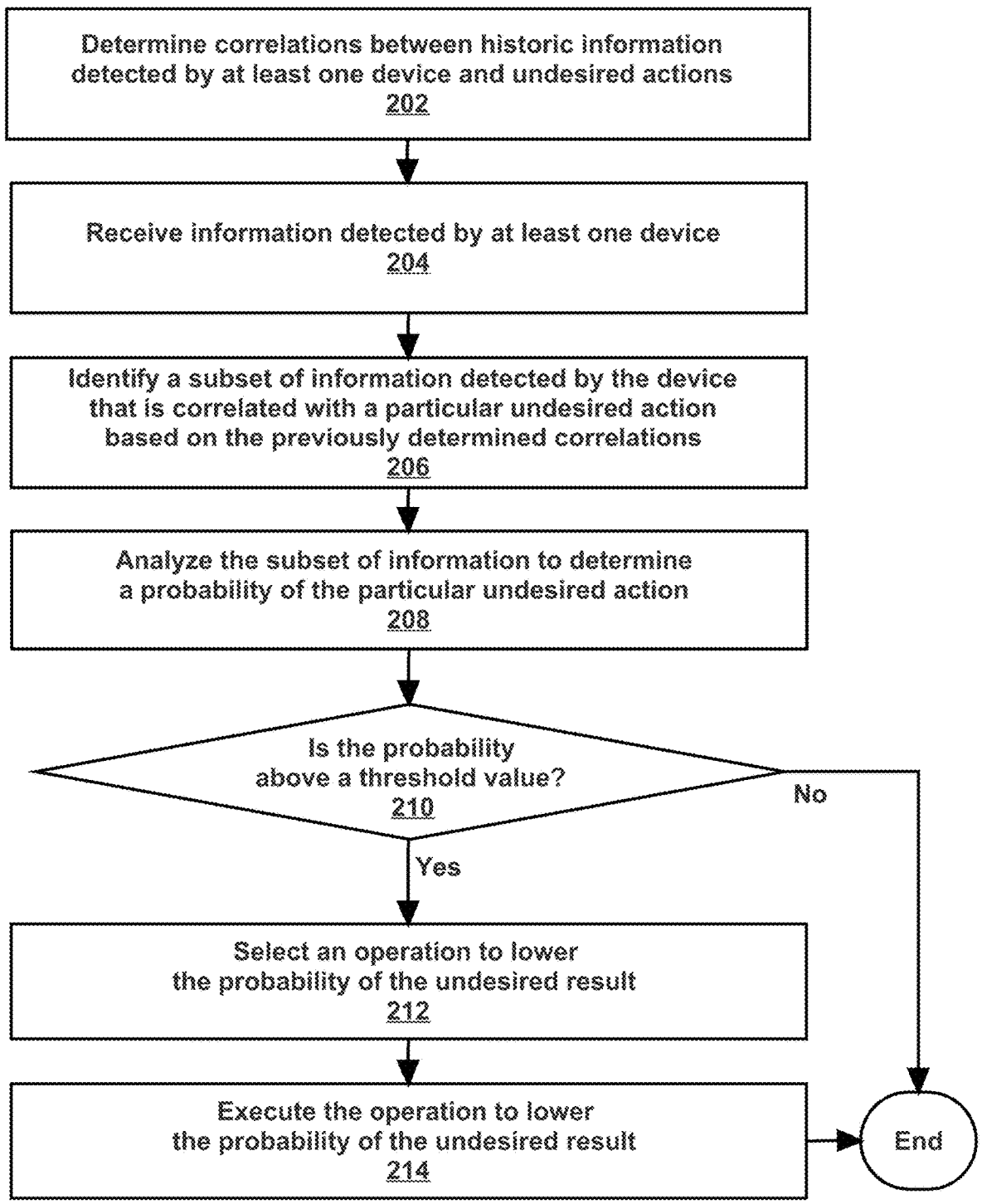
FIG. 2A illustrates an example set of operations for presenting a promotional offer to lower a probability of an undesired action by a person using detected data in accordance with one or more embodiments.

FIG. 2A illustrates an example set of operations for presenting a promotional offer to lower a probability of an undesired action by a person using detected data in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

Initially, correlations between historic information detected by at least one device and undesired actions are determined, in accordance with one or more embodiments (Operation 202). A system receives one or more sets of detected data from one or more devices. The system may be connected to the devices via a wired and/or wireless connection. In an embodiment, data communication between the system and the devices utilizes web service application programming interfaces that adhere to Representational State Transfer (RESTful APIs). The detected data is stored as historical information in a data repository of a system and is monitored by the system.

In an embodiment, each set of detected data is associated with a different person. Each set of detected data may be associated with a single data type or multiple data types. Each set of detected data may include data detected by devices associated with a single entity or multiple entities. In an example, a number of steps walked by a person is detected by a pedometer managed by a fitness company. An opening and closing of a door of a hotel room of the person is detected by an accelerometer fixed on the door by the hotel. The number of steps walked by the person and the opening and closing of the door forms a set of detected data associated with the person.

In an embodiment, undesired actions are received from one or more entities. The entities that specify the undesired actions may be the same or different from the entities that manage devices detecting data. In an embodiment, undesired actions are specified by an employee or an agent of an entity through a user interface. As an example, an agent of a supermarket specifies that an undesired action is the purchase of goods by a user at a neighboring supermarket. As another example, an agent of an online gaming company specifies that an undesired action is a user's surfing away from the gaming website.

In an embodiment, a correlation coefficient, or other correlation measurement, is determined between different data types, associated with the historical information, and undesired actions. In an embodiment, sets of detected data that include data representing a particular undesired action are identified. In an example, an undesired action of a first supermarket is the purchase of goods from a second supermarket. Sets of detected data that include payment data indicating a purchase of goods from the second supermarket are identified as sets of detected data including data representing the undesired action.

In an embodiment, within the identified sets of detected data, data that is consistently detected prior to the data representing the particular undesired action is identified. A high correlation is determined between (a) the data type of the data that is consistently detected prior to the data representing the particular undesired action and (b) the undesired action. Correlations may be determined using machine learning, statistical analysis, pattern recognition, artificial intelligence, data modeling, and/or any type of data analysis well known in the art.

In an example, an undesired action of a hotel is a guest's submission of a review with a poor rating. A first review having a low rating is submitted by a first guest, and a second review having a low rating is submitted by a second guest. Data preceding the submission of the first review and the second review are summarized below in Table 1.

Data preceding the submission of the first review includes: (a) motion data detecting that the first guest remained in his hotel room for over two hours during the day, and (b) payment data detecting that the first guest had a cup of coffee at the hotel cafe.

Data preceding the submission of the second review includes: (a) motion data detecting that the second guest remained in his hotel room for over two hours during the day, and (b) payment data detecting that the second guest did not have a cup of coffee at the hotel cafe.

TABLE 1

|  | Data Preceding First Review with Low Rating | Data Preceding Second Review with High Rating |
|---|---|---|
| Motion Data | First guest remained in room for over two hours | Second guest remained in room for over two hours |
| Payment Data | First guest had coffee at cafe | Second guest did not have coffee at cafe |

Continuing this example, motion data detecting that the guest remained in the room for over two hours is consistently detected prior to a review with a low rating. Therefore, a high correlation coefficient is found for the relationship between motion data detecting that the guest remained in the room for over two hours and a review with a low rating.

Payment data detecting that the guest had coffee at the hotel cafe is not consistently detected prior to a review with a low rating. A low correlation coefficient is found for the relationship between payment data detecting that the guest had coffee and a review with a low rating.

In one or more embodiments, information detected by at least one device is received (Operation 204). A system receives detected data from the same devices that received the historic information at Operation 202. In an example, a device detects one or more physical actions performed by a person. The device is located in a same physical environment as the person. In an embodiment, data communication between the system and the devices utilizes web service application programming interfaces that adhere to Representational State Transfer (RESTful APIs). The detected data may be associated with a single data type or multiple data types. The devices may be associated with a single entity or multiple entities.

In one or more embodiments, a subset of information detected by the devices that is correlated with a particular undesired action is identified based on the correlations previously determined at Operation 202 (Operation 206). A subset of information is referred to herein as being "correlated" with a particular undesired action if the correlation coefficient for the relationship between the data type associated with the subset of information and the particular undesired action is above a threshold.

In an example, a first correlation coefficient between a first data type and a particular undesired action is above the threshold. A second correlation coefficient between a second data type and the particular undesired action is below the threshold. Based on the correlation coefficients, a first subset of the information detected at Operation 204, that is associated with the first data type, is identified as being correlated with the particular undesired action. A second subset of the information detected at Operation 204, that is associated with the second data type, is identified as not being correlated with the particular undesired action.

In an example, an undesired action of a hotel is a guest review with a low rating. A correlation coefficient above a threshold is found for the relationship between motion data detecting that the guest remained in the room for over two hours and a review with a low rating. A correlation coefficient below the threshold is found for the relationship between payment data detecting that the guest had coffee and a review with a low rating.

Continuing this example, information about a particular guest is received from the devices. Motion data for the particular guest indicates that the particular guest has remained in the room for over two hours. Payment data indicates that the particular guest did not have coffee. Based on the correlation coefficients previously determined, the motion data for the particular guest is identified as a subset of information that is correlated with the undesired action. The payment data is not identified as a subset of information that is correlated with the undesired action.

In one or more embodiments, the subset of information is analyzed to determine a probability of the particular undesired action (Operation 208). The subset of information that is identified as correlated with the undesired action is aggregated together and analyzed, while another subset of information that is not identified as correlated with the undesired action is not analyzed. In an embodiment, a higher correlation coefficient between a subset of information and an undesired action indicates a higher probability that the undesired action will occur. In an embodiment, certain combinations of subsets of information that are correlated with an undesired action indicates a higher probability that the undesired action will occur, while other combinations of subsets of information that are correlated with the undesired action indicates a lower probability that the undesired action will occur.

In an example, an undesired action of a first coffee store is that a cup of coffee is purchased from a second coffee store. A correlation coefficient above a threshold is determined for the relationship between location data indicating that a potential customer has been standing in line at the first coffee store for over three minutes and the undesired action. A correlation coefficient above a threshold is determined for the relationship between payment data indicating a potential customer has not had any coffee today and the undesired action. A correlation coefficient below a threshold is determined for the relationship between motion data indicating the number of steps a potential customer has walked today and the undesired action.

Continuing this example, based on the correlation coefficients, the location data and the payment data are identified as a subset of information that is correlated to the undesired action. The motion data is not identified as a subset of information that is correlated to the undesired action.

Continuing this example, the location data and the payment data are aggregated together to determine a probability of the undesired action. An analysis of the aggregated data is summarized in Table 2 below.

If the location data indicates that the potential customer has been in line at the first coffee store for over three minutes, and the payment data indicates that the potential customer has not had any coffee today, then a probability that the potential customer will go to the second coffee store for coffee is high. If location data indicates that the potential customer has been in line at the first coffee store for over three minutes, and the payment data indicates that the potential customer has had coffee today, then a probability that the potential customer will go to the second coffee store for coffee is medium. If location data indicates that the potential customer has not been in line at the first coffee store for over three minutes, and the payment data indicates that the potential customer had not had coffee today, then a probability that the potential customer will go to the second coffee store for coffee is medium.

TABLE 2

|  | Has not had any coffee today | Has had coffee today |
| --- | --- | --- |
| In line at the first coffee store for over three minutes | Probability of undesired action is high | Probability of undesired action is medium |
| Not in line at the first coffee store for over three minutes | Probability of undesired action is medium | Probability of undesired action is low |

In one or more embodiments, an inquiry is made as to whether the probability is above a threshold value (Operation 210). The threshold value may be specified by the entity that specified the undesired action, or may be specified by another entity.

In an example, an undesired action of a first coffee store is that a cup of coffee is purchased from a second coffee store. The threshold value for the probability of the undesired action is 80%. Subsequently, location data is detected for a particular potential customer. Location data indicates that the particular potential customer has stood in line at the first coffee store for two minutes. The probability of the undesired action is 20%. The threshold value has not been satisfied. Then, location data indicates that the particular potential customer has stood in line at the first coffee store for three minutes. The probability of the undesired action is 50%. The threshold value has not been satisfied. Then, location data indicates that the particular potential customer has stood in line at the first coffee store for five minutes. The probability of the undesired action is 80%. The threshold value is satisfied.

In one or more embodiments, if the threshold value is not satisfied, then the process ends. If the threshold value is satisfied, then an operation to lower the probability of the undesired action is selected (Operation 212). In an embodiment, the operation to lower the probability of the undesired action is specified by the entity that specified the undesired action, or another entity. In another embodiment, the operation to lower the probability of the undesired action is determined based on historic information.

In an example, an undesired action of a first coffee store is that a cup of coffee is purchased from a second coffee store by a potential customer of the first coffee store. The first coffee store desires to offer a discount for coffee at the first coffee store if the probability of the undesired action is above 80%. The operation to lower the probability of the undesired action is specified by the first coffee store as offering a discount for coffee at the first coffee store.

In another example, an undesired action of a first coffee store is that a cup of coffee is purchased from a second coffee store by a potential customer of the first coffee store. Historic information indicates that if a discount is offered to the potential customer, then the potential customer will likely purchase coffee from the first coffee store. Based on the historic information, the operation to lower the probability of the undesired action is determined to be offering a discount for coffee at the first coffee store to the potential customer.

In an embodiment, the offer to be provided for a user (for example, the amount of discount to be offered) is determined based on an analysis of the detected data and/or the probability of the undesired action. In an example, an undesired action of a first coffee store is that a cup of coffee is purchased from a second coffee store. Based on historic information, if location data indicates that a potential customer has been in line at the first coffee store for five minutes, then a discount of 10% for coffee at the first coffee store lowers the probability that the potential customer will purchase coffee at the second coffee store. If location data indicates that a potential customer has been in line at the first coffee store for eight minutes, then a discount of 15% for coffee at the first coffee store lowers the probability that the potential customer will purchase coffee at the second coffee store.

In an embodiment, the operation to lower the probability of the undesired action is selected from a set of available operations. The set of available operations is determined based on an inventory. The inventory is updated by the entity that specified the undesired action, or another entity. The inventory may be maintained as a database that is updated through RESTful APIs. If the inventory indicates that there is an excess in a particular product, then a promotional offer for the particular product is provided.

In an example, an undesired action of a company is the burnout of an employee at the company. An operation to lower the probability of the undesired action is to offer a vacation to the employee. The company accesses an inventory of vacation packages. Various hotels, airline companies, and car rental companies update the inventory. A particular hotel provides that two queen rooms are available and one king room is available. A particular airline company provides that two tickets from San Francisco to Los Angeles are available. A particular car rental company provides that a luxury vehicle and a sports car are available. Based on the inventory, the company selects a vacation package to be offered to the employee.

In an example, an undesired action of a store is that a person departs from the store. An operation to lower the probability of the undesired action is to offer a free gift from the store. An inventory of free gifts is maintained by the store. If a probability of the undesired action is above 80%, then a first gift, if available in the inventory, is offered. If a probability of the undesired action is above 90%, then a second gift, if available in the inventory, is offered.

In one or more embodiments, the operation to lower the probability of the undesired action is executed (Operation 214). The operation to lower the probability of the undesired action presents a promotional offer for discounted and/or free goods and/or services at a user interface. The promotional offer may be presented through an application on a smartphone, a web browser on a laptop, or any other applications and/or devices. The user then has an option to accept or reject the promotional offer.

In an example, a coupon providing a discount at a particular coffee shop is presented at a smartphone. The user shows the coupon on the smartphone to a salesperson of the particular coffee shop in order to apply the discount to the user's purchase.

In an example, a free vacation package is presented in an email to a user. The email provides a website at which the user may select specific travel dates. The user accesses the website to select travel dates and confirm the reservation of the vacation package.

4. PRESENTING A PROMOTIONAL OFFER USING DETECTED DATA FROM MULTIPLE BUSINESS ENTITIES

Figure 2B:
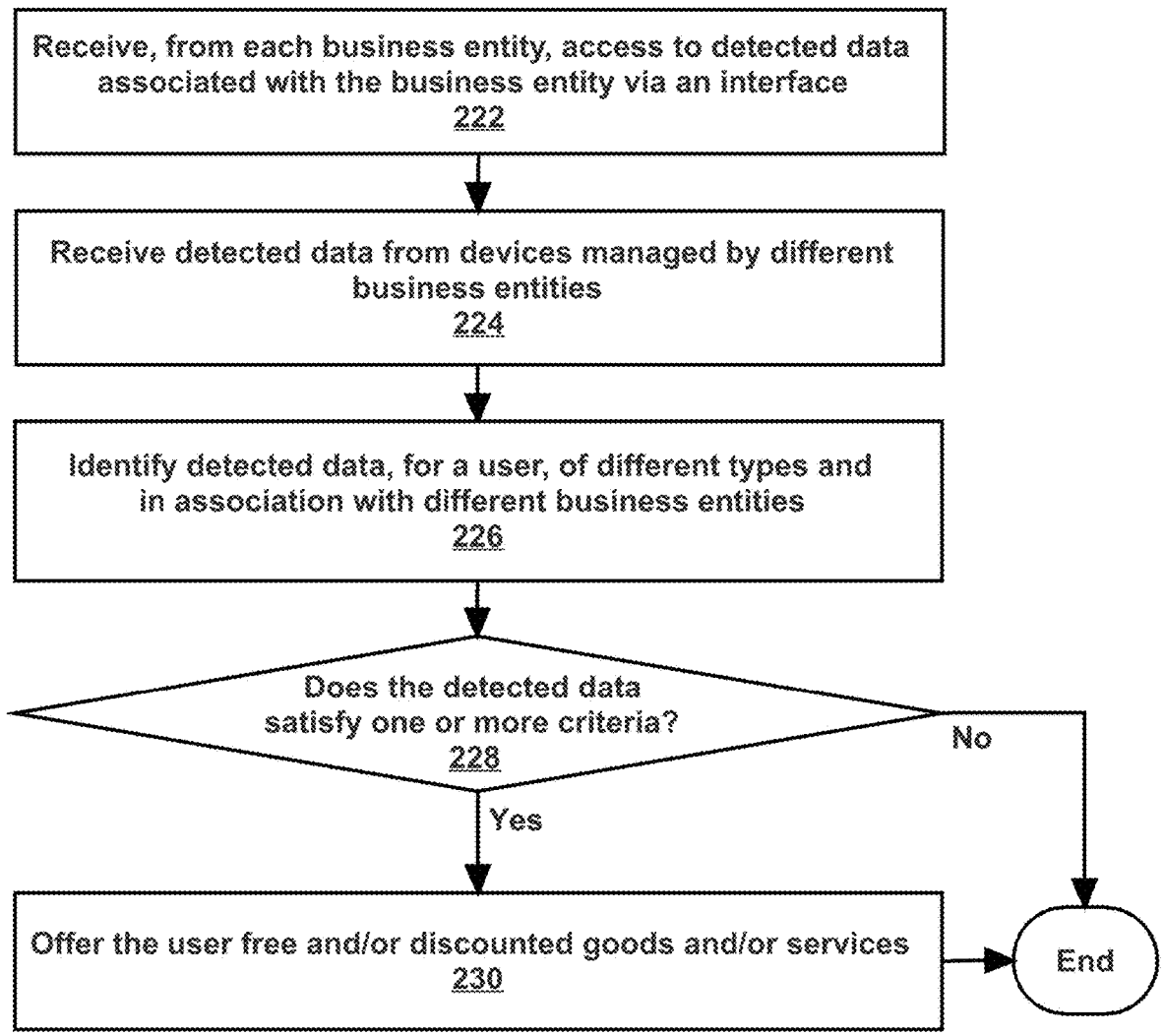
FIG. 2B illustrates an example set of operations for presenting a promotional offer using detected data from multiple business entities in accordance with one or more embodiments.

FIG. 2B illustrates an example set of operations for presenting a promotional offer using detected data from multiple business entities in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments.

Initially, access to detected data associated with multiple business entities is received via an interface from the respective business entities (Operation 222). An interface receives user input authorizing a system to access certain detected data. The authorization is specified on a per-device basis. For example, authorized access is provided to all detected data from certain devices. Alternatively, the authorization is specified for particular detected data of particular devices. For example, authorized access is provided to certain types of detected data from a device. As another example authorized access is provided to detected data from a device during certain times of the day.

In an embodiment, detected data associated with a business entity includes data detected by devices managed by the business entity. In an example, a hotel affixes an accelerometer on a door of a guest room. Detected data associated with the hotel includes motion data detected by the accelerometer.

In an embodiment, a business entity authorizes access to the detected data of the business entity in exchange for detected data of other business entities. Multiple business entities may exchange detected data with each other based on contractual relationships with each other. Additionally or alternatively, multiple business entities may exchange detected data with each other based on contractual relationships with an intermediary, such as an entity that manages a cloud environment to receive the detected data.

In one or more embodiments, detected data is received from devices managed by different business entities (Operation 224). A system receives detected data from multiple devices. The system may be connected to the multiple devices via a wired and/or wireless connection. In an embodiment, data communication between the system and the multiple devices utilizes web service application programming interfaces that adhere to Representational State Transfer (RESTful APIs).

In an embodiment, the detected data is stored in a multi-tenant database in a cloud environment. The detected data is tagged with an identifier of the business entity from which the detected data was received. The detected data from a first device managed by a first business is not known to a second business. The detected data from a second device managed by the second business is not known to the first business. However, the detected data from the first business and the second business are collected together in the cloud environment and known to the system in the cloud environment.

In an embodiment, data representing a first action is detected by a first device, managed by a first business entity, during a first time period t1. Data representing a second action is detected by a second device, managed by a second business entity, during a second time period t2. Time period t1 is different from time period t2. Further, the first device is located in a different physical environment than the second device. The physical environment of the first device is under the control of the first business entity, and the physical environment of the second device is under the control of the second business entity. A system receives detected data from both the first device and the second device.

In one or more embodiments, detected data, for a user, of different types and in association with different business entities, is identified (Operation 226). In an embodiment, detected data for a particular user is identified based on an identifier of the particular user included in the detected data. Detected data from different devices may use different identifiers for referring to a same user. When detected data including an identifier of a user is received, the identifier is converted or translated into a uniform identifier of the user. In an example, motion data detected by a user's fitness tracker includes a username of the user for the fitness tracker application. Payment data indicating a user's purchase of a good or service includes a credit card number of the user. The username and the credit card number are translated into an identification number used by the system to refer to the user.

In an embodiment, detected data for a particular user is identified based on a chain of information related to the particular user. At the beginning of the chain is a piece of information that includes an identifier of the user and an identifier of a first object. Another piece of information includes an identifier of the first object and an identifier of a second object. Another piece of information includes an identifier of the second object and an identifier of a third object. Detected data for the user includes detected data related to the second object and the third object.

In an example, a user profile includes a user's name and home address. A security device includes both a motion detector for detecting motion and a GPS for detecting location. The GPS detects that the security device is located at the user's home address. Based on the same address being included in the user profile and being detected by the security device, motion data detected by the security device is determined as detected data for the user.

In an example, the chain of information related to a particular user includes cross-correlation of location data. A smartphone carried by a user includes an identifier of the user (such as a username, a telephone number, or other identification). A GPS on the smartphone detects a user's location. At the same time, a GPS on a taxi detects a location of the taxi. As the user rides in the taxi, the location of the user and the location of the taxi matches. Therefore, the user riding on the taxi is identified based on the identifier of the user specified by the user's smartphone. Continuing this example, the GPS on the taxi detects that the taxi has been stuck in traffic for the past hour. A promotional offer is presented to the user at the user's smartphone, based on the match between the location of the taxi and the location of the user.

In an embodiment, detected data for a particular user includes detected data related to other users associated with the particular user. In an example, a promotional offer is provided to a particular user if five friends of the particular user purchase an item from a particular store. The five friends are identified through a social media application. Whether to provide the offer to the particular user is determined based on payment data of the five friends.

In an embodiment, the detected data is associated with multiple types and multiple business entities. For example, a number of steps walked by a user is detected by a pedometer managed by a fitness company. An opening and closing of a door of a hotel room is detected by an accelerometer fixed on the door by the hotel. A rental car reservation is detected by a device managed by a car rental company.

In an embodiment, the detected data includes data representing micro-actions. The data representing micro-actions may be processed by the system to obtain additional information. For example, motion data detected by an accelerometer is received. The accelerometer is affixed to a door. By analyzing the motion data, a number of times that the door is opened and closed is determined. The detected data includes active action by a user, such as a login, to a website, made by a user. The detected data includes passive action by a user, such as a facial recognition of the user.

In one or more embodiments, an inquiry is made as to whether the detected data satisfy one or more criteria (Operation 228). The criteria are specified by an entity that is transmitting the detected data to the system, an entity that is providing a promotional offer for the user, or another entity. A criterion may be a specific event, and/or a threshold number of times that an event occurs.

In an embodiment, whether the criteria are satisfied is determined by a system that is independent of the business entities from which the detected data originated. The system receives detected data from multiple business entities. The system then determines whether the detected data matches the criteria. The system then outputs whether a match has been found. A particular business entity may receive the system output indicating whether a match has been found, but does not have direct access to the detected data from other business entities.

In an example, the criteria are: (a) a user books a hotel ten times through a particular travel website, and (b) a user hits heavy traffic on the commute to work for five consecutive days. Whether criteria (a) is satisfied is determined based on payment data from the particular travel website, which is managed by a travel company. Whether criteria (b) is satisfied is determined based on location data detected by a GPS, affixed to the user's car and managed by the car manufacturer. The data is of different types (payment data and location data) and in association with different business entities (travel company and car manufacturer). A system compares the data with the criteria to determine whether the criteria are satisfied. The car manufacturer is unaware of the user's hotel bookings. The hotel is unaware of the location of the car.

In an embodiment, the criteria are specified based on a probability of a particular result, such as an undesired action. The criteria are met if the probability is above a particular threshold. A probability of a particular result in association with one or more subsets of detected data is determined using historical information. In an example, historical information indicates a high correlation between motion data indicating that a person walks quickly through a store and the undesired action that the person departs from the store without making a purchase. Motion data is detected by a particular device, indicating that a particular person is walking quickly through the store. Based on the motion data, a probability of the undesired action is 75%. The criterion for presenting a promotional offer is that the probability of the undesired action is above 70%. Since the criterion is met, the promotional offer is presented to the person.

In one or more embodiments, if the criteria are not satisfied, then the process ends. If the criteria are satisfied, then one or more free and/or discounted goods and/or services are offered to the user (Operation 230). The free and/or discounted goods and/or services are specified by an entity that is transmitting the detected data to the system, an entity that is providing a promotional offer for the user, or another entity.

In an embodiment, each criteria is associated with one or more free and/or discounted goods and/or services. The association is specified in a table, a set of rules, or another format. In an example, a first set of criteria is: (a) a user books a hotel ten times through a particular travel website, and (b) a user hits heavy traffic on the commute to work for five consecutive days. A second set of criteria is: (a) a user books a particular hotel five times, and (b) a user bikes to work for five consecutive days. If the first set of criteria is satisfied, then a free audio book about traveling is offered to the user. If the second set of criteria is satisfied, then a free night at the particular hotel is offered to the user during an annual bike-a-thon event.

In an embodiment, the free and/or discounted goods and/or services are offered by an entity that is unaware of the detected data received from other business entities. In an example, a system receives hotel booking data from a device managed by a hotel company. The system also receives location data from a GPS on a car managed by a car manufacturer. An online bookstore desires to offer a free audio book. The online bookstore provides that the criteria for providing the free audio book are: (a) a user books a hotel ten times through a particular travel website, and (b) a user hits heavy traffic on the commute to work for five consecutive days. The system determines whether the hotel booking data and the location data satisfies the criteria. If yes, then the system triggers a free audio book to be offered to the user by the online store. The online store is unaware of the hotel booking data and the location data.

In an embodiment, the offer for discounted and/or free goods and/or services is presented at a user interface, such as through an application on a smartphone, a web browser on a laptop, or any other applications and/or devices. The user then has an option to accept or reject the offer.

5. EXAMPLE EMBODIMENTS

Figure 3:
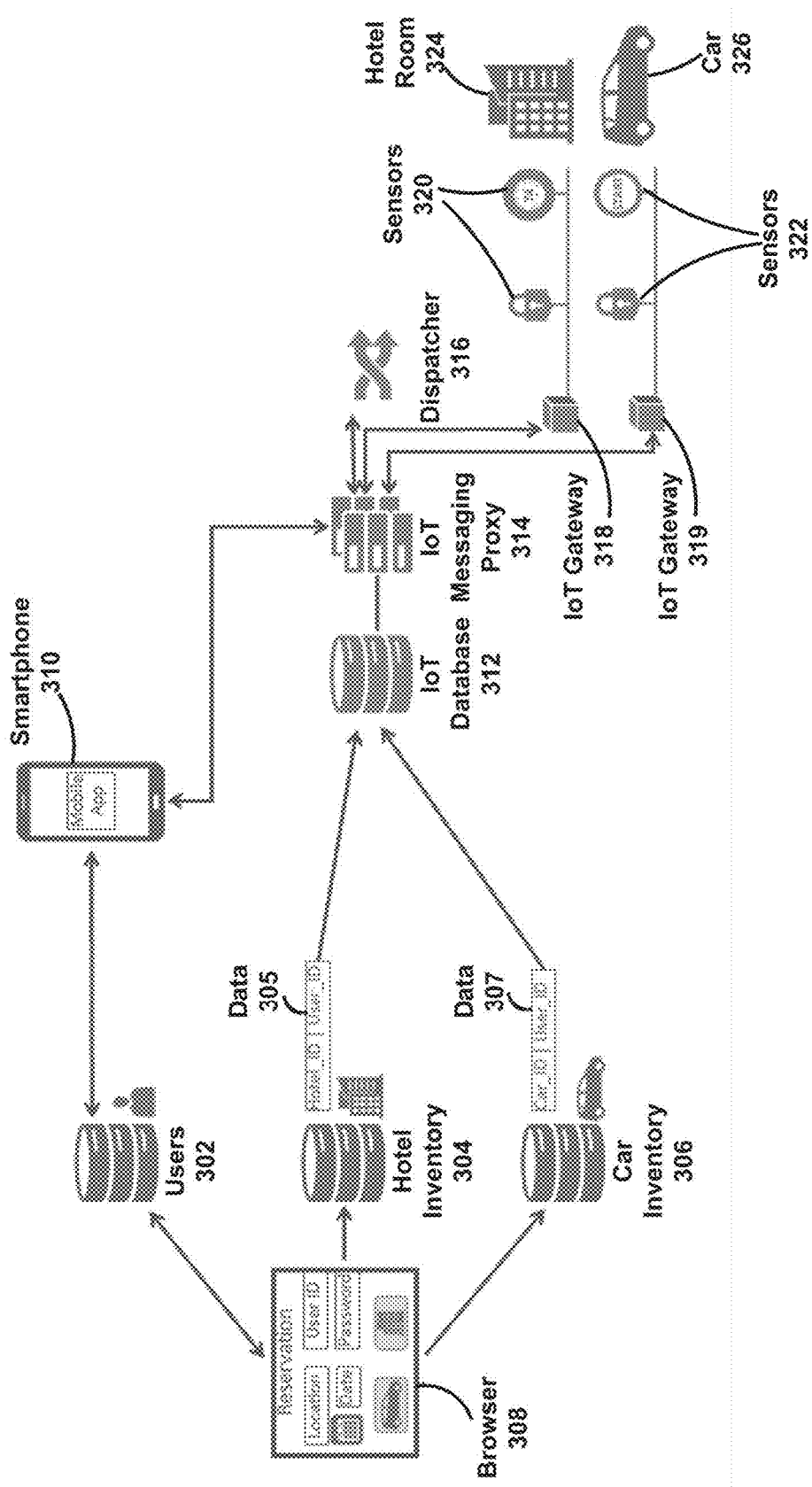
FIG. 3 illustrates an example embodiment for providing a promotional offer using detected data.

FIG. 3 illustrates an example embodiment for providing a promotional offer using detected data. One or more detailed examples are described below for purposes of clarity. Components and/or operations described below should be understood as specific examples which may not be applicable to certain embodiments. Accordingly, components and/or operations described below should not be construed as limiting the scope of any of the claims.

In an example, referring to FIG. 3, detected data is received from two business entities, a hotel company and a car rental company. Various different promotional offers are described below as examples that include the use of the detected from one or both of the businesses. In this example, a user is authenticated based on a user database 302. Payment data for the user is received from a hotel website at browser 308. Payment data from the hotel website, managed by a hotel company, indicates that the user has made a hotel reservation. Payment data for the user is received from a car rental website at browser 308. Payment data from the car rental website, managed by a car rental company, indicates that the user has made a car rental reservation. Payment data is provided to the Internet of Things (IoT) database 312. Hotel inventory 304 and car rental inventory 306 are also updated and provided to IoT database 312.

The user picks up a rental car at the car rental company. The user attempts to start the engine of the car. A sensor 322, affixed to the car, indicates that the user has attempted to start the car engine five times without success. The sensor 322 is managed by the car rental company. Detected data from sensor 322 is sent to gateway 319, which is sent to IoT messaging proxy 314 and IoT database 312. Based on historic information, a probability that a customer submits a poor review of the car rental company (i.e., an undesired result) after the customer is unable to start the car engine after five attempts is determined. Dispatcher 316 determines that the probability of the undesired action is above a threshold.

The car rental company desires to offer a substitute car to a user to lower the probability that the customer would submit a poor review. The car rental company specifies that if a user has attempted to start the car engine for five times or more without success, then a substitute car is offered to the user. The substitute car is presented as a promotional offer to the user through IoT messaging proxy 314 on a mobile application at the user's smartphone 310.

Next, the user uses another mobile application managed by the hotel company to check in at the hotel. The user uses a mobile application and RFID technology to unlock the door of the hotel room. A sensor 320, affixed on the door of the hotel room, indicates that the user is entering the hotel room at 5 pm. The sensor 320 is managed by the hotel company. Detected data from sensor 320 is sent to gateway 318, which is sent to IoT messaging proxy 314 and IoT database 312.

The hotel company desires to offer a free snack at the vending machine if these criteria are satisfied: (a) the user is entering the hotel room between 4 pm and 6 pm, and (b) the user has rented a full-size or larger car, from the car rental company. If the criteria are satisfied, then a promotion code for the vending machine is offered to the user. The promotion code is presented to the user through IoT messaging proxy 314 on the mobile application at the user's smartphone 310.

In another example, a device managed by a hotel detects that a hotel guest is in the hotel room between 4 pm and 6 pm. Another device managed by the hotel receives an input from a manager of a hotel restaurant, indicating that happy hour is between 4 pm and 6 pm. Based on the data detected by the two devices, a happy hour discount is offered to the user. The happy hour discount is presented to the user through a mobile application managed by the hotel.

In another example, a device managed by a car rental company detects that a user has driven around a parking lot of a convention center for ten minutes or more. A device managed by the convention center detects the locations of available parking spots. Based on the data from the two devices, a parking discount is offered to the user, and the location of the nearest available parking spot is provided to the user. The location of the nearest available parking spot is provided through a navigation application on the user's smartphone, which navigates the user to the parking spot. The parking discount is also presented to the user through an application on the smartphone.

In another example, a proximity sensor is managed by a bar and is affixed to a television inside the bar. The proximity sensor detects the locations of customers relative to the television (based on Wi-Fi, Bluetooth, GPS, and/or other technology). Payment data indicates the purchases of the customers from the bar. A first set of criteria is as follows: (a) a customer is within three feet of the television, and (b) the customer has not purchased anything from the bar for the past two hours. If the first set of criteria is met, then a discount on food is offered to the customer. A second set of criteria is as follows: (a) a first customer is within three feet of the television, and (b) a second customer has provided user input into an application managed by the bar, indicating that the second customer would like to watch another television channel. If the second set of criteria is met, then a text message or email is sent to the first customer, requesting a channel change. If a channel change is detected by the television, a drink is provided for free to the first customer, and paid for by the second customer. A third set of criteria is as follows: (a) a customer is within three feet of the television, and (b) a noise level detected by a microphone at the bar is above a threshold. If the third set of criteria is met, then a text message or email is sent to the customer, indicating that a free drink would be provided by the bar, if the customer would set the television to a sports channel. Alternatively, if the third set of criteria is met, then a text message or email is sent to the customer, suggesting that the customer move to a quieter spot in the bar. A free drink would be provided to the customer, if the customer moves to a quieter spot.

In another example, motion data indicates whether the door of a mini-fridge in a hotel room has been opened and closed, and payment data from a vending machine in the hotel indicates whether a drink has been purchased from the vending machine. A set of criteria is as follows: (a) the mini-fridge door has been opened and closed, and (b) a drink has been purchased from the vending machine. If the criteria are met, then a rebate coupon may be provided by a soda company.

In another example, a sensor in Japan detects whether a homerun has been scored by a baseball player on a particular team. Payment data indicates that a particular user has been to multiple games of the particular team and/or purchased merchandise related to the particular team. Based on the data, a free drink is offered to the user, when the particular team scores a homerun.

In another example, a facial recognition device detects a hotel guest entering the lobby of a hotel. Payment data from a restaurant outside the hotel indicates that the hotel guest did not have dessert during dinnertime. Based on the data, the hotel offers the hotel guest a discount for the dessert served at the hotel restaurant.

In another example, user profile data indicates that a customer of a car rental company is between 20 and 25 years old. Motion data is detected by a sensor fixed to a car rented by the customer. The motion data indicates that the car has not traveled above 60 miles per hour. The car rental company desires to achieve a low rate of accidents with the cars offered for rental. To reward the young customer for driving at a safe speed, the car rental company offers a free week of rental to the customer.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
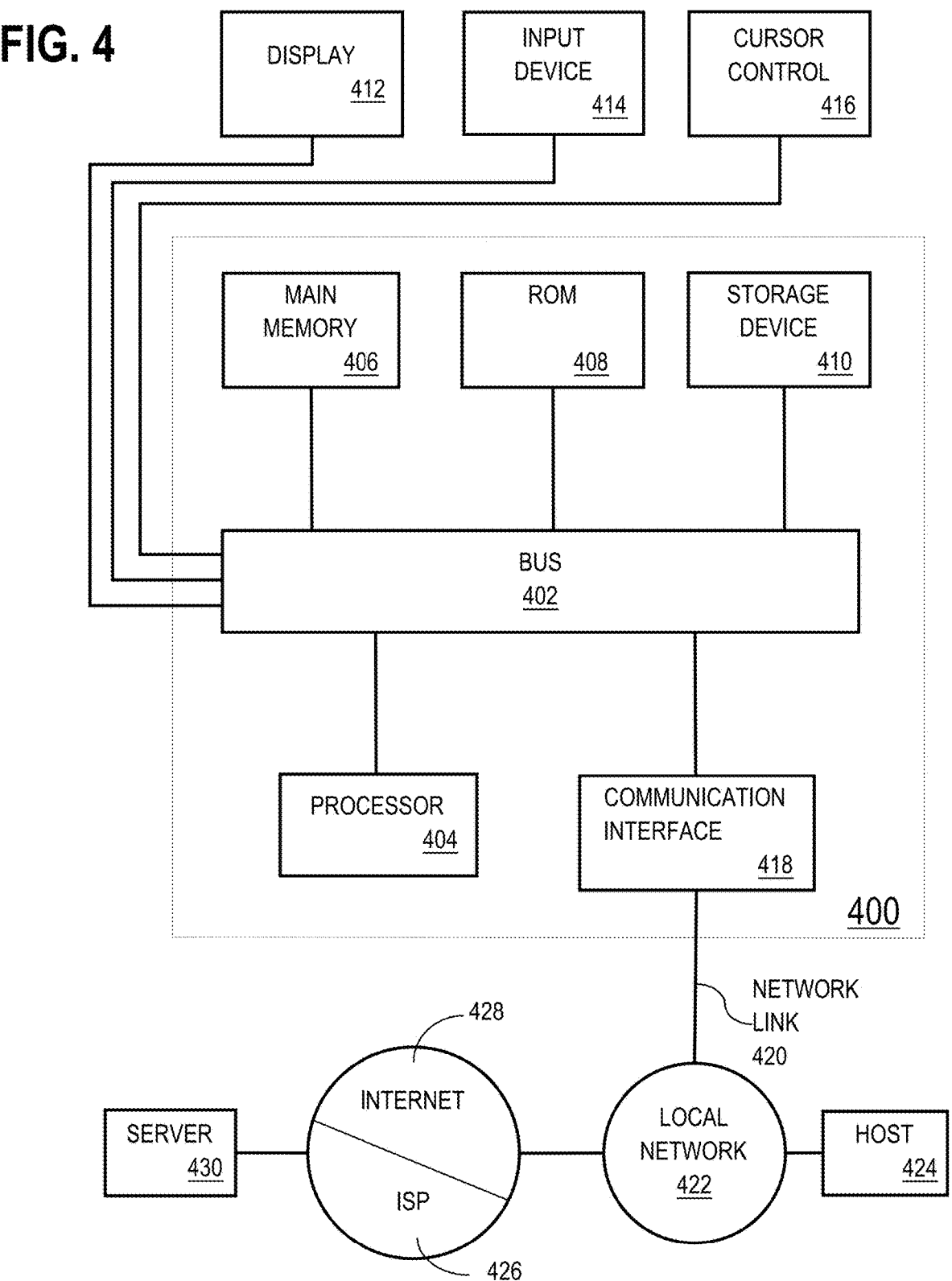
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   obtaining a first set of data from a user device associated with a first tenant;
   responsive to determining that the user device is associated with the first tenant: tagging the first set of data with a first identifier of the first tenant;
   storing, into a multi-tenant database, the first set of data that is tagged with the first identifier of the first tenant;
   obtaining a second set of data from a set of one or more devices associated with a second tenant, wherein the second set of data is detected by the set of one or more devices, and the set of one or more devices does not include the user device;
   responsive to determining that the set of one or more devices is associated with the second tenant: tagging the second set of data with a second identifier of the second tenant;
   storing, into the multi-tenant database, the second set of data that is tagged with the second identifier of the second tenant;
   wherein the first tenant has access to the first set of data stored in the multi-tenant database based on the first identifier of the first tenant that tags the first set of data, but the first tenant does not have access to the second set of data stored in the multi-tenant database based on the second identifier of the second tenant that tags the second set of data;
   wherein the second tenant has access to the second set of data stored in the multi-tenant database based on the second identifier of the second tenant that tags the second set of data, but the second tenant does not have access to the first set of data stored in the multi-tenant database based on the first identifier of the first tenant that tags the first set of data;
   determining that the user device is associated with a particular user;
   correlating the first set of data and the second set of data to determine that the second set of data is associated with the particular user, the correlating operation comprising:
      determining that at least one of the user device and the first set of data is associated with a first attribute;
      determining that at least one of the set of one or more devices and the second set of data is associated with a second attribute;
      determining whether the first attribute and the second attribute match;
      responsive at least to determining that first attribute and the second attribute match:
      determining that the second set of data is associated with the particular user;
   identifying a first set of historic data indicating each of a first plurality of users was associated with the second set of data and was not presented a promotional offer;
   determining a first value for a probability that the particular user would perform an undesired action given that the particular user is not presented the promotional offer, based on at least the first set of historic data;
   identifying a second set of historic data indicating each of a second plurality of users was associated with the second set of data and was presented the promotional offer;
   determining a second value for the probability that the particular user would perform the undesired action given that the particular user is presented the promotional offer, based on at least the second set of historic data;
   determining that presenting the promotional offer lowers the probability that the particular user would perform the undesired action based on the first value and the second value;
   responsive at least to determining that presenting the promotional offer lowers the probability that the particular user would perform the undesired action:
      presenting the promotional offer at the user device;
   wherein the method is performed by at least one device including a hardware processor.

2. The method of claim 1, wherein the second set of data includes information indicating performance of one or more physical actions, a first physical action of the one or more physical actions is detected by a first device, and a second physical action of the one or more physical actions is detected by a second device different than the first device.

3. The method of claim 1, wherein the first set of data is associated with a first data type and the second set of data is associated with a second data type.

4. The method of claim 1, further comprising:
   selecting the promotional offer from a plurality of promotional offers based on the first value for the probability that the particular user would perform the undesired action.

5. The method of claim 1, wherein obtaining the data comprises:
   selecting the first set of data, from a plurality of sets of data, responsive to determining that a type of the first set of data correlates to the probability that the particular user would perform the undesired action.

6. The method of claim 1, wherein the undesired action comprises the user leaving the physical environment without purchasing any of a particular set of goods and/or services.

7. The method of claim 1, wherein the undesired action comprises the user purchasing goods and/or services from a competing business.

8. The method of claim 1, wherein the promotional offer comprises one or more of: (a) free goods, (b) discounted goods, (c) free services, or (d) discounted services.

9. A non-transitory computer readable medium comprising instructions which, when executed by one or more hardware processors, causes performance of operations comprising:
obtaining a first set of data from a user device associated with a first tenant;
responsive to determining that the user device is associated with the first tenant: tagging the first set of data with a first identifier of the first tenant;
storing, into a multi-tenant database, the first set of data that is tagged with the first identifier of the first tenant;
obtaining a second set of data from a set of one or more devices associated with a second tenant, wherein the second set of data is detected by the set of one or more devices, and the set of one or more devices does not include the user device;
responsive to determining that the set of one or more devices is associated with the second tenant: tagging the second set of data with a second identifier of the second tenant;
storing, into the multi-tenant database, the second set of data that is tagged with the second identifier of the second tenant;
wherein the first tenant has access to the first set of data stored in the multi-tenant database based on the first identifier of the first tenant that tags the first set of data, but the first tenant does not have access to the second set of data stored in the multi-tenant database based on the second identifier of the second tenant that tags the second set of data;
wherein the second tenant has access to the second set of data stored in the multi-tenant database based on the second identifier of the second tenant that tags the second set of data, but the second tenant does not have access to the first set of data stored in the multi-tenant database based on the first identifier of the first tenant that tags the first set of data;
determining that the user device is associated with a particular user;
correlating the first set of data and the second set of data to determine that the second set of data is associated with the particular user, the correlating operation comprising:
determining that at least one of the user device and the first set of data is associated with a first attribute;
determining that at least one of the set of one or more devices and the second set of data is associated with a second attribute;
determining whether the first attribute and the second attribute match;
responsive at least to determining that first attribute and the second attribute match:
determining that the second set of data is associated with the particular user;
identifying a first set of historic data indicating each of a first plurality of users was associated with the second set of data and was not presented a promotional offer;
determining a first value for a probability that the particular user would perform an undesired action given that the particular user is not presented the promotional offer, based on at least the first set of historic data;
identifying a second set of historic data indicating each of a second plurality of users was associated with the second set of data and was presented the promotional offer;
determining a second value for the probability that the particular user would perform the undesired action given that the particular user is presented the promotional offer, based on at least the second set of historic data;
determining that presenting the promotional offer lowers the probability that the particular user would perform the undesired action based on the first value and the second value;
responsive at least to determining that presenting the promotional offer lowers the probability that the particular user would perform the undesired action:
presenting the promotional offer at the user device.

10. The medium of claim 9, wherein the second set of data includes information indicating performance of one or more phycial actions, a first physical action of the one or more physical actions is detected by a first device, and a second physical action of the one or more physical actions is detected by a second device different than the first device.

11. The medium of claim 9, wherein the first set of data is associated with a first data type and the second set of data is associated with a second data type.

12. The medium of claim 9, wherein the operations further comprise:
selecting the promotional offer from a plurality of promotional offers based on the first value for the probability that the particular user would perform the undesired action.

13. The medium of claim 9, wherein obtaining the data comprises:
selecting the first set of data, from a plurality of sets of data, responsive to determining that a type of the first set of data correlates to the probability that the particular user would perform the undesired action.

14. The medium of claim 9, wherein the undesired action comprises the user leaving the physical environment without purchasing any of a particular set of goods and/or services.

15. The medium of claim 9, wherein the undesired action comprises the user purchasing goods and/or services from a competing business.

16. The medium of claim 9, wherein the promotional offer comprises one or more of: (a) free goods, (b) discounted goods, (c) free services, or (d) discounted services.

17. A system comprising:
at least one device including a hardware processor; and
the system configured to perform operations comprising:
obtaining a first set of data from a user device associated with a first tenant;
responsive to determining that the user device is associated with the first tenant: tagging the first set of data with a first identifier of the first tenant;
storing, into a multi-tenant database, the first set of data that is tagged with the first identifier of the first tenant;
obtaining a second set of data from a set of one or more devices associated with a second tenant, wherein the second set of data is detected by the set of one or more devices, and the set of one or more devices does not include the user device;
responsive to determining that the set of one or more devices is associated with the second tenant: tagging the second set of data with a second identifier of the second tenant;

storing, into the multi-tenant database, the second set of data that is tagged with the second identifier of the second tenant;

wherein the first tenant has access to the first set of data stored in the multi-tenant database based on the first identifier of the first tenant that tags the first set of data, but the first tenant does not have access to the second set of data stored in the multi-tenant database based on the second identifier of the second tenant that tags the second set of data;

wherein the second tenant has access to the second set of data stored in the multi-tenant database based on the second identifier of the second tenant that tags the second set of data, but the second tenant does not have access to the first set of data stored in the multi-tenant database based on the first identifier of the first tenant that tags the first set of data;

determining that the user device is associated with a particular user;

correlating the first set of data and the second set of data to determine that the second set of data is associated with the particular user, the correlating operation comprising:

determining that at least one of the user device and the first set of data is associated with a first attribute;

determining that at least one of the set of one or more devices and the second set of data is associated with a second attribute;

determining whether the first attribute and the second attribute match;

responsive at least to determining that first attribute and the second attribute match:

determining that the second set of data is associated with the particular user;

identifying a first set of historic data indicating each of a first plurality of users was associated with the second set of data and was not presented a promotional offer;

determining a first value for a probability that the particular user would perform an undesired action given that the particular user is not presented the promotional offer, based on at least the first set of historic data;

identifying a second set of historic data indicating each of a second plurality of users was associated with the second set of data and was presented the promotional offer;

determining a second value for the probability that the particular user would perform the undesired action given that the particular user is presented the promotional offer, based on at least the second set of historic data;

determining that presenting the promotional offer lowers the probability that the particular user would perform the undesired action based on the first value and the second value;

responsive at least to determining that presenting the promotional offer lowers the probability that the particular user would perform the undesired action: presenting the promotional offer at the user device.

18. The system of claim 17, wherein the second set of data includes information indicating performance of one or more physical actions, a first physical action of the one or more physical actions is detected by a first device, and a second physical action of the one or more physical actions is detected by a second device different than the first device.

19. The method of claim 1, wherein the second set of data comprises facial recognition data detected by at least one facial recognition device.

20. The method of claim 1, wherein:
the first set of data comprises payment data indicating that a particular product or service has not been purchased;
the second set of data comprises motion data indicating that the user has remained in the same physical environment for a duration of time that is above a threshold value;
the promotional offer is associated with the particular product or service.

21. The method of claim 1, wherein the operations further comprise:
determining that a particular product or service is within an inventory of a particular entity that does not have access to either the first set of data or the second set of data;
determining the promotional offer for the particular product or service.

22. The method of claim 1, wherein the undesired action is specified by an entity that does not have access to either the first set of data or the second set of data.

23. The method of claim 1, wherein the promotional offer is provided by an entity that does not have access to either the first set of data or the second set of data.

* * * * *

UNITED STATES PATENT AND TRADEMARK OFFICE
CERTIFICATE OF CORRECTION

Page 1 of 1

PATENT NO. : 10,762,525 B2
APPLICATION NO. : 14/870450
DATED : September 1, 2020
INVENTOR(S) : Wong It is certified that error appears in the above-identified patent and that said Letters Patent is hereby corrected as shown below:

On the Title Page

On page 2, Column 2, item (56) under Other Publications, Line 18, delete "Retrived" and insert -- Retrieved --, therefor.

In the Claims

In Column 22, Line 21, in Claim 10, delete "phycial" and insert -- physical --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*